(12) United States Patent
Cazals

(10) Patent No.: US 8,113,464 B2
(45) Date of Patent: Feb. 14, 2012

(54) AUTONOMOUS PLANE ARCHITECTURE FOR THE TRANSPORT AND THE REPLACEMENT OF PROPULSION ENGINES

(75) Inventor: Olivier Cazals, Daux (FR)

(73) Assignee: Airbus France, Toulouse (FR)

( * ) Notice: Subject to any disclaimer, the term of this patent is extended or adjusted under 35 U.S.C. 154(b) by 965 days.

(21) Appl. No.: 12/108,662

(22) Filed: Apr. 24, 2008

(65) Prior Publication Data
US 2011/0226899 A1    Sep. 22, 2011

(51) Int. Cl.
*B64C 1/20*    (2006.01)
(52) U.S. Cl. ............... 244/118.1; 244/54; 244/45 R; 244/35; 244/137.1
(58) Field of Classification Search ............... 244/54, 244/35, 45 R, 137.1, 119, 118.1; 60/797, 60/796
See application file for complete search history.

(56) References Cited

U.S. PATENT DOCUMENTS

| 3,194,515 | A * | 7/1965 | Cohan ............... 244/54 |
| 3,666,211 | A * | 5/1972 | Cathers et al. ............... 244/54 |
| 7,107,755 | B2 * | 9/2006 | El Hamel et al. ............... 60/224 |
| 7,240,877 | B2 * | 7/2007 | Cazals et al. ............... 244/54 |
| 7,905,449 | B2 * | 3/2011 | Cazals et al. ............... 244/55 |
| 2006/0011779 | A1 * | 1/2006 | Cazals et al. ............... 244/54 |
| 2008/0073459 | A1 * | 3/2008 | Cazals et al. ............... 244/13 |
| 2009/0084889 | A1 * | 4/2009 | Cazals et al. ............... 244/12.1 |

FOREIGN PATENT DOCUMENTS

| EP | 1616786 A | 1/2006 |
| FR | 2302912 A | 10/1976 |
| GB | 1243392 A | 8/1971 |

* cited by examiner

*Primary Examiner* — Tien Dinh
*Assistant Examiner* — Justin Benedik
(74) *Attorney, Agent, or Firm* — Perman & Green, LLP

(57) ABSTRACT

To be able to transport and replace in an autonomous manner one of its failing propulsion engines, a plane includes: a fuselage; propulsion engines maintained above the fuselage; maintenance wells traversing the fuselage substantially vertically with respect to the engines in which the engines can be lifted or lowered; a cargo compartment including a floor arranged in the fuselage, where the height, length and width dimensions of the cargo compartment are compatible with the transport of an engine; the cargo compartment and the wells have a common separation wall including an exit whose dimensions allow the passage of an engine; and a lower hatch or ramp for closing the lower opening of the well includes a position in which the upper surface of the ramp is substantially horizontal and substantially in the extension of the floor of the cargo compartment. According to this arrangement, a propulsion engine can be replaced by an engine which is transported in the cargo compartment in the autonomous manner for the plane.

9 Claims, 4 Drawing Sheets

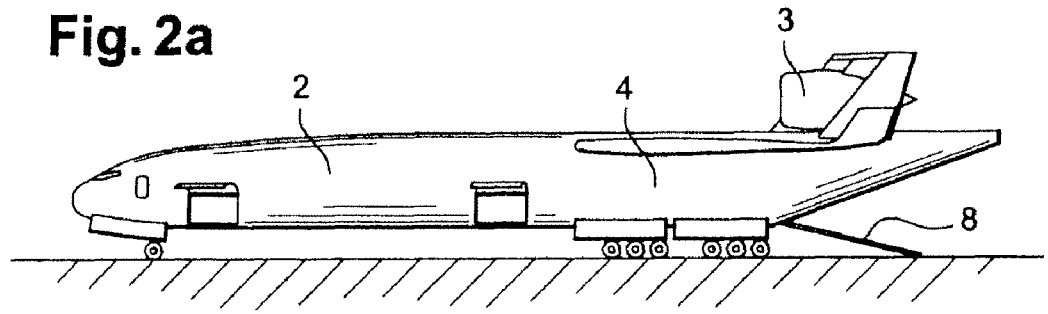
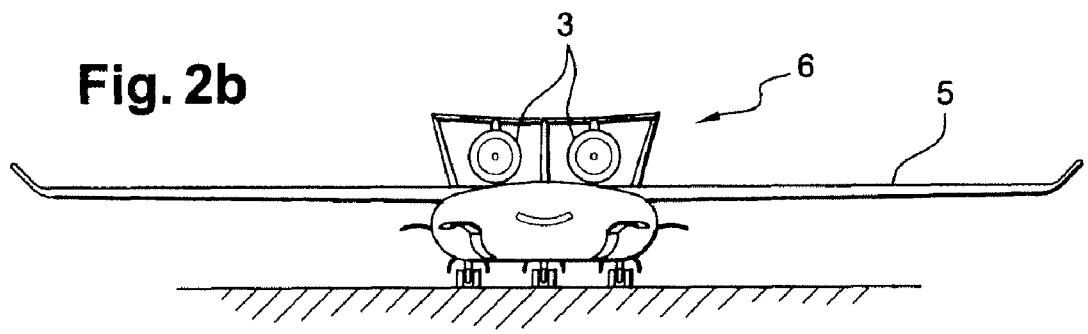
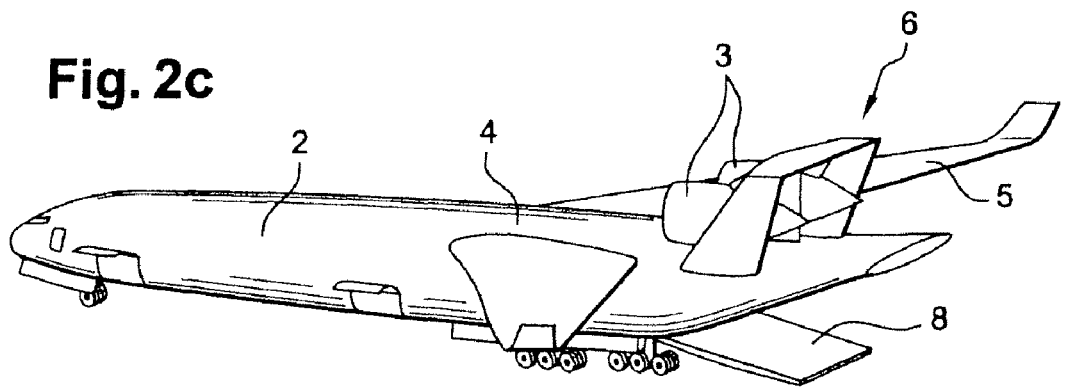

AUTONOMOUS PLANE ARCHITECTURE FOR THE TRANSPORT AND THE REPLACEMENT OF PROPULSION ENGINES

BACKGROUND

1. Field

The disclosed embodiments belong to the field of planes comprising a cargo compartment intended for the transport of voluminous objects.

2. Brief Description of Related Developments

In particular, the disclosed embodiments relate to a plane architecture where the principles of installation of the propulsion engines of the plane and the arrangement of the cargo compartment intended to transport loads allow the plane to be autonomous to perform the replacement of a propulsion engine.

Today, planes that have the capacities to transport loads or cargo, and fall within the field of interest of the disclosed embodiments, i.e., transport planes with large capacity, particularly in terms of volume, are available in various shapes and dimensions.

SUMMARY

The planes that are used for the transport of voluminous loads, i.e., cargo planes specializing in this type of transports, can be classified into three principal categories.

The first category corresponds to logistics transport planes, which today are essentially used for military transport. These planes have a conventional architecture comprising a fuselage and, in general, a fixed wing in a high position on the fuselage.

The fuselage, whose dimensions are adapted to the volumes of the loads to be transported, comprises at least one rear door in the axis of the fuselage. The advantage of such an axial rear door is to be able to load the fuselage along its axis, which turns out to be advantageous for entering wheeled vehicles or for loading long loads, such as, a plane or helicopter fuselage.

In addition, these rear doors comprise a lower ramp that allows the autonomous loading of the vehicles, when the plane is on the ground, and the opening during flight to release voluminous loads, in general on palettes that are extracted from the cargo compartment with an extracting parachute.

The selection of the high wing for this type of plane is made generally to make it possible to have a fuselage, and particularly a loading floor in the fuselage, which is as close as possible to the ground when the plane is on the ground, while preserving a sufficient height with respect to the ground for the engines, which are generally fixed to or under the wing.

The Nord Aviation Transall C160 or the Lockheed Hercules C130, or the future A400M, are examples of such propeller driven cargo planes.

The Lockheed Galaxy C5 and the Antonov 225 Mriya are examples of the largest planes in the world today that belong to the class of such cargo jet planes.

In this type of jet plane, the jet engines, whose thrust is large because of the dimensions and the weight of these planes, present large dimensions, but the oversized cargo compartments of these planes make it possible to transport a replacement engine if needed, although this was not an intended special mission. However, the linear arrangement of the loads in the cargo compartment of such planes reduces the carrying capacities in terms of useful load, if the decision is made to transport a replacement engine, particularly in view of the fact that, due to the installation of the engines under the wing, voluminous and heavy tools have to be taken along to dismount an engine from the wing and transport it, and to install the replacement engine. For this reason, the transporting of an engine, in the case of these planes, is generally considered only a specific mission, usually the delivery of an engine to a base where a plane of the same type or of another type has to be repaired.

The second, most common, category of cargo transport planes corresponds to that of passenger transport planes that have been modified for the transport of loads, particularly on palettes or in containers for logistics reasons, distributed on the different decks, when two or more floor levels are available.

In these cases, the most obvious differences are the replacement of the furnishings of the passenger cabin with means to allow the movement and securing of the palettes and containers as well as the presence of openings associated with cargo doors of large dimension on the side of the fuselage for the passage of voluminous loads.

This type of cargo meets the needs of the transport of loads in the civil domain in a majority of the situations at a reasonable cost, because these cargo versions derived from passenger versions have lower nonrecurrent costs of development.

However, it presents the disadvantage of having limited cargo compartment dimensions, particularly in terms of height, due to the position, which is imposed by the passenger versions, for the structure of the floors in the fuselage.

Thus, the transport of loads of large dimension is limited, on the one hand, by the useful cross section of the cargo compartment at the level of each deck and, on the other hand, by the dimensions of the lateral, or exceptionally axial, cargo doors.

The Airbus A300F and the Boeing B747F are examples among others of versions that are adapted for the transport of cargo from planes for passenger transport.

Due to their limited cargo compartment size, these planes are generally not capable of transporting a replacement engine of the same model as their propulsion engines in the cargo compartment, except in some cases for the currently largest plane of this category, i.e., the B747.

A third category regroups planes that are designed specifically for transport missions involving voluminous loads under optimal conditions. In this case, the cross section of the cargo compartment, the length of the cargo compartment, and the dimensions of the loading doors are determined to meet a special need.

The currently most representative example of this category is the Airbus A300-600ST which is used for the transport of preassembled parts of the Airbus fuselage.

With this type of plane, the loading and unloading operations are carried out with special tools that are adapted to the loads, and in general they are carried out under optimal conditions at loading and unloading sites equipped with adapted logistics means.

Because of its large cargo compartment volume, such a plane is capable of transporting an engine of large dimension, but it has no means, except to use its cargo compartment for the transport of such means, that allow the loading, unloading, and replacement of one of its engines in an autonomous way.

All the existing solutions, when they allow the transport of a replacement engine, allow this transport to be performed only at the cost of serious operational difficulties and to the detriment of the remainder of the useful load, in which the transporter engine occupies a large volume.

Thus, it is apparent that, among the current planes that use jet engines of large diameter (generally turbofan jet engines), no satisfactory solution exists to allow a plane, in case of the need to replace a jet engine in a completely autonomous manner, to be able to transport a replacement jet engine and the means needed to carry out the replacement of a jet engine, without unacceptable impact on the useful load of the plane.

The disclosed embodiments relate precisely to the definition of a plane architecture, particularly an arrangement pertaining to the engines, the fuselage, and the cargo compartments of planes, which solves these difficulties.

For this purpose, a plane comprises a fuselage, at least one propulsion engine maintained above the fuselage, and a maintenance well that traverses the fuselage substantially vertically with respect to at least one propulsion engine, in which said engine can be lifted or lowered.

To transport and be able to replace an engine, the plane comprises additionally:

a cargo compartment arranged in the fuselage, where the dimensions along the height, the length and the width of said cargo compartment are compatible with loading a propulsion engine;

the cargo compartment and the well(s) have a common separation wall, which wall comprises one exit whose dimensions allow the passage of an engine; and a lower hatch for closing a lower opening of the well which comprises a position in which the upper surface of the hatch is substantially horizontal and substantially in the extension of the floor of the cargo compartment.

Advantageously, the width of the cargo compartment makes it possible to transport at least two propulsion engines of the plane side by side depending on the wing span of the plane, to have sufficient space available to switch the engine to be replaced and the replacement engine, and to carry out the replacement with a minimum of movements of the engines.

To provide a work and movement surface for the engines, the lower hatch is connected by articulation at one of its edges, in proximity to the exit, along an axis which is substantially in the plane of the floor of the cargo compartment, and advantageously the lower hatch is sufficiently wide to extend, depending on the wing span of the plane, under two or more wells.

When the engines are of large diameter, as in the case of the modern turbofan jet engines, for example, the height of the cargo compartment in which the engines are transported corresponds preferably to the cumulative height of two or more decks of a zone of the fuselage adjacent to the cargo compartment, and, to reduce the weight of the structure of the plane, the cargo compartment is not pressurized during flight.

To have the benefit of an advantageous fuselage height, particularly when the propulsion engines of the plane are installed towards the rear of the fuselage, which generally corresponds to a zone with lower interior height of the fuselage, the cargo compartment is preferably in front of the well, with respect to the direction of movement of the plane during the flight.

In a preferred embodiment, which is particularly adapted to the disclosed embodiments, the engine(s) is (are) maintained above the fuselage fixed to a support structure comprising a horizontal empannage which itself is maintained above the fuselage by a vertical structure.

When two or more engines are maintained above the fuselage, each engine is associated with a maintenance well that traverses the fuselage.

Advantageously, to facilitate the operations of installation and dismounting of the engines, each engine is fixed under the horizontal empannage through the intermediary of a mounting structure.

The disclosed embodiments are applied particularly advantageously when the engines are turbofan jet engines with high dilution ratio, particularly with dilution ratios greater than five.

The detailed description of embodiment examples of the disclosed embodiments are made in reference to the figures which represent schematically:

BRIEF DESCRIPTION OF THE DRAWINGS

FIGS. 2a, 2b, 2c: a side view, a front view, and a perspective view of the plane of FIG. 1b represented on the ground;

Figure 1A:
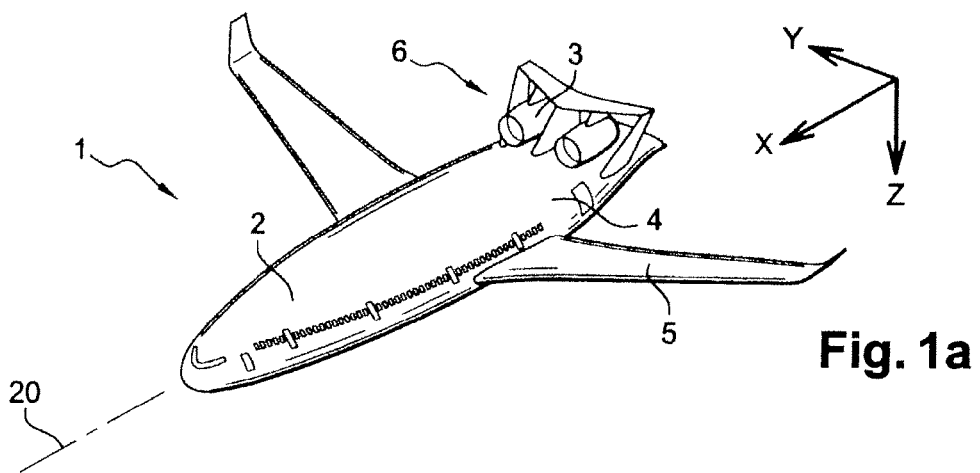
FIG. 1a: an overall perspective view of a plane according to the disclosed embodiments comprising a fuselage to which a low wing is fixed.

A plane 1 according to a described example of the disclosed embodiments comprises:

a fuselage 2;

at least one propulsion engine 3 maintained above the fuselage;

at least one engine cargo compartment 4, inside the fuselage, where the engine cargo compartment has dimensions in terms of width, height and length that are sufficient to ensure the transport of at least one engine identical to the plane's propulsion engines 3.

For the purposes of the description of an embodiment of the disclosed embodiments, reference is made to three principal reference axes of a conventional plane:

an X axis which is parallel to the longitudinal axis 20 of the fuselage oriented positively towards the front of the plane;

a Z axis perpendicular to the X axis parallel to a vertical plane of symmetry of the plane, oriented positively downward; and a Y axis perpendicular to the plane defined by the directions X and Z, oriented positively towards the right of the plane.

The term fuselage should be understood here to denote generally a part of the plane 1 in which volumes are arranged to transport useful loads, particularly passengers or cargo.

DETAILED DESCRIPTION OF THE DRAWINGS

Figure 1B:
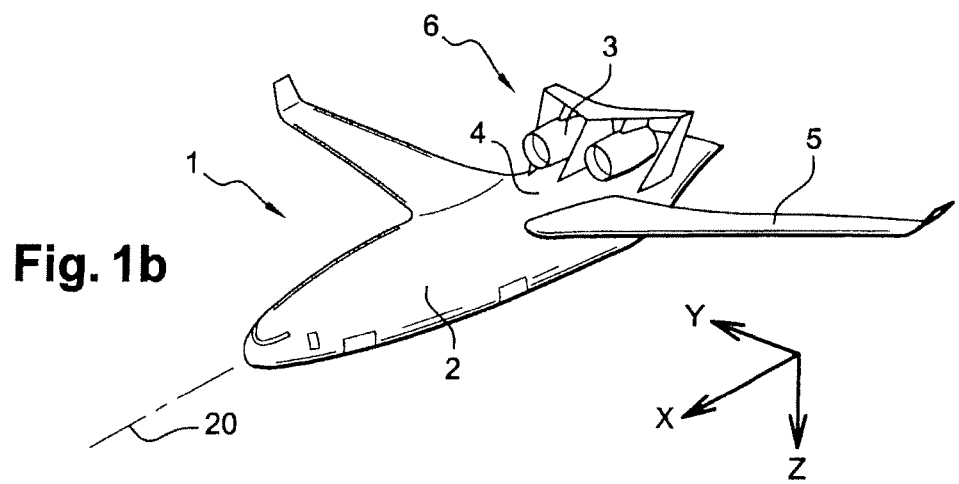
FIG. 1b: an overall perspective view of a plane according to the disclosed embodiments comprising a fuselage to which a high wing is fixed.

When a plane 1 according to the disclosed embodiments can comprise a fuselage 2 that has a generally elongated form, to which a wing 5 is fixed, which can be fixed at the low part of the fuselage 2, as illustrated in FIG. 1a, or at the top part of the fuselage, as illustrated in FIG. 1b, particularly as a function of the mission types considered for the plane.

Figure 1C:
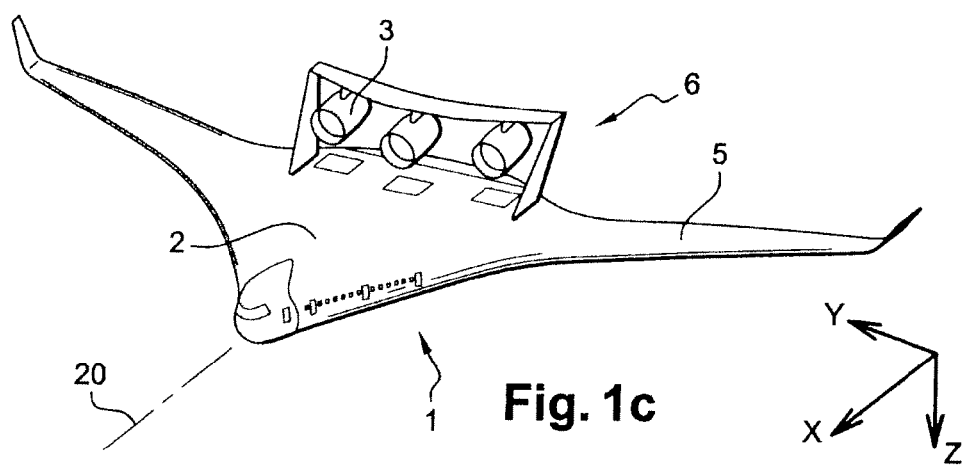
FIG. 1c: an overall perspective view of a plane according to the disclosed embodiments presenting an architecture of the flying wing type.

A plane 1 according to the disclosed embodiments can also present the architecture of a flying wing, as illustrated in FIG. 1c, in which the fuselage 2 does not present a distinct form with respect to the wing 5, where the volumes arranged for the passengers or for the cargo are then concentrated on a central part of the wing whose thickness in said central part is increased greatly in comparison to a conventional wing.

The remainder of the detailed description of an embodiment concerns, as an illustration, the case of a plane 1 according to the example of FIG. 1b comprising a fuselage 2, which is distinct from the wing on which a wing 5 is fixed in a high position, but this example is not limiting.

The plane 1 comprises at least one propulsion engine 3, two in the example presented in FIGS. 2a, 2b and 2c which represent such a plane seen from the side, the front, and along a perspective, where the engine is fixed above the fuselage in a rear part of the plane.

Said engine(s) 3 is (are) fixed to a support structure 6, which is also used advantageously as an empannage assembly of the plane comprising a horizontal empannage 61, which is maintained by the substantially vertical structures 62 forming advantageously, at least for some of them, a vertical empannage.

The engines 3 are fixed in such a way that during an operation of installation of an engine or during an operation of dismounting an engine, for example, for maintenance operations or during the replacement of an engine, the engine 3 can be moved vertically downward for a dismounting operation or, conversely, moved upward for an operation of installation.

Figure 3:
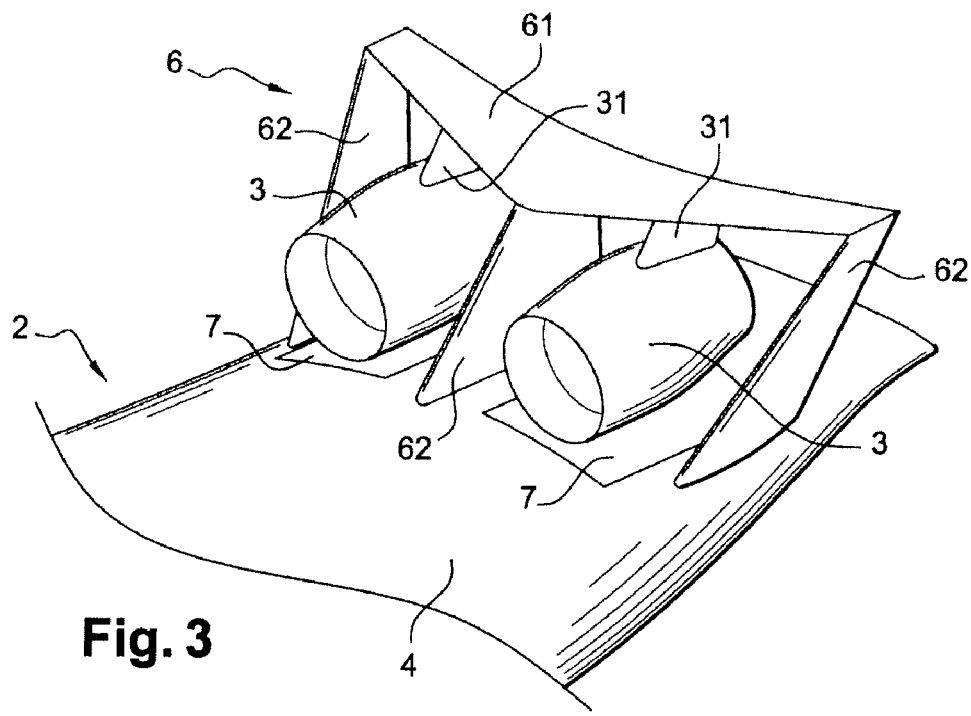
FIG. 3: a detail of a back arrangement of engines above the fuselage.

Such a result is obtained advantageously, as presented in the detail of the rear part of the plane of FIG. 3, by fixing the engines 3 under the horizontal empannage 61 by means of mounting structures 31, in the same way as is done generally to fix engines under a wing.

This type of mounting is used particularly with jet engines, particularly turbofan jet engines with a high dilution ratio, i.e., a dilution ratio on the order of 5 or more, which are mounted by hooking under the wing of a plane.

In addition, the structure of the fuselage 2 comprises vertically with respect to each engine a traversing opening 7, called well, whose dimensions are sufficient to allow the passage of the engine 3 in question during a substantially vertical lifting or lowering movement.

Each well 7 comprises an upper opening 71 that opens on an upper surface of the fuselage 2, on the side of the negative values of Z in the plane's reference system, and a lower opening 72, which opens on a lower part of the fuselage 2, on the side of the positive values of Z in the plane's reference system, and substantially vertical walls, particularly a front vertical wall 73, on the side of the positive values along the X axis in the plane's reference system, in which a loading cargo compartment 4 is located.

The upper opening 71 and the lower opening 72 of a well 7 are closed during normal flight conditions by an upper hatch 74 and a lower hatch 8, which ensure the aerodynamic continuity of the fuselage 2.

Figure 4:
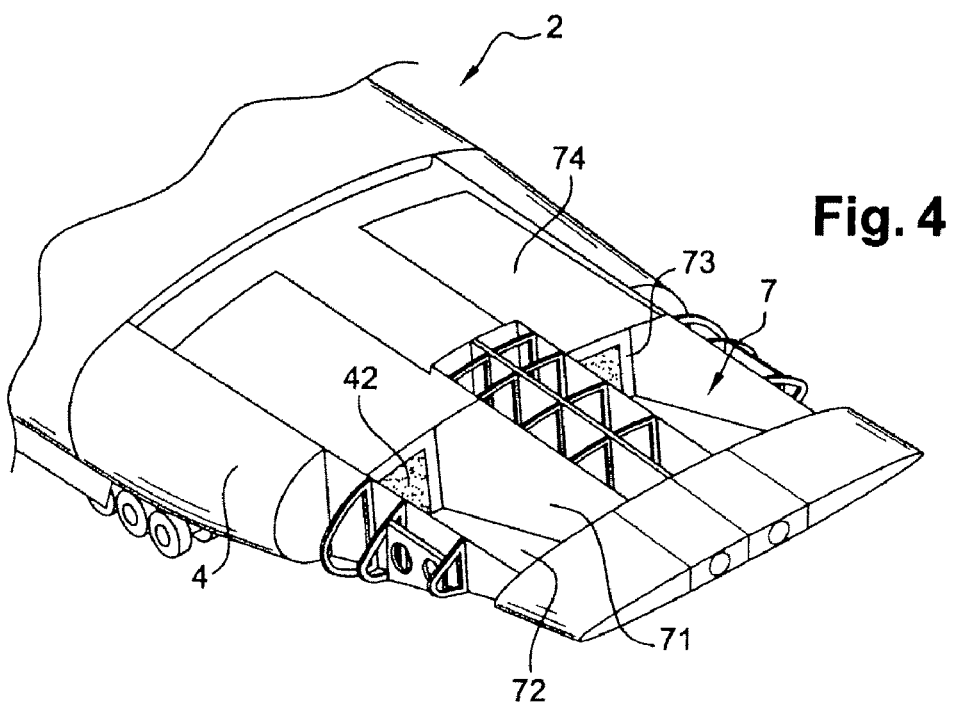
FIG. 4: a detail with partial cutaway view of a back arrangement of a fuselage and of wells for lowering engines.

Advantageously, the upper hatches 74, which close the upper openings, are sliding hatches which, for example, slide above the fuselage 2 to release the upper openings 71, or which slide inside the fuselage, for example, forward in a false ceiling of the loading cargo compartment 4, as illustrated in the partially cutaway view of FIG. 4 in which the engines 3 and the support structure 6 are not represented.

Other forms of hatches, which are not represented, for example hatches that are articulated into two or more panels, are possible provided there is no interference with the engines 3 during the opening and closing movements of said hatches.

The lower hatches 8, at least one hatch per well, although one hatch can correspond to two or more wells, which close the upper opening 72, are articulated on a side 81 of the hatch, preferably along a rotation axis that is substantially in the plane of a floor 41 of the cargo compartment 4, to ensure the continuity between the floor 41 of the cargo compartment 4 and an upper surface of the hatch.

Figure 6:
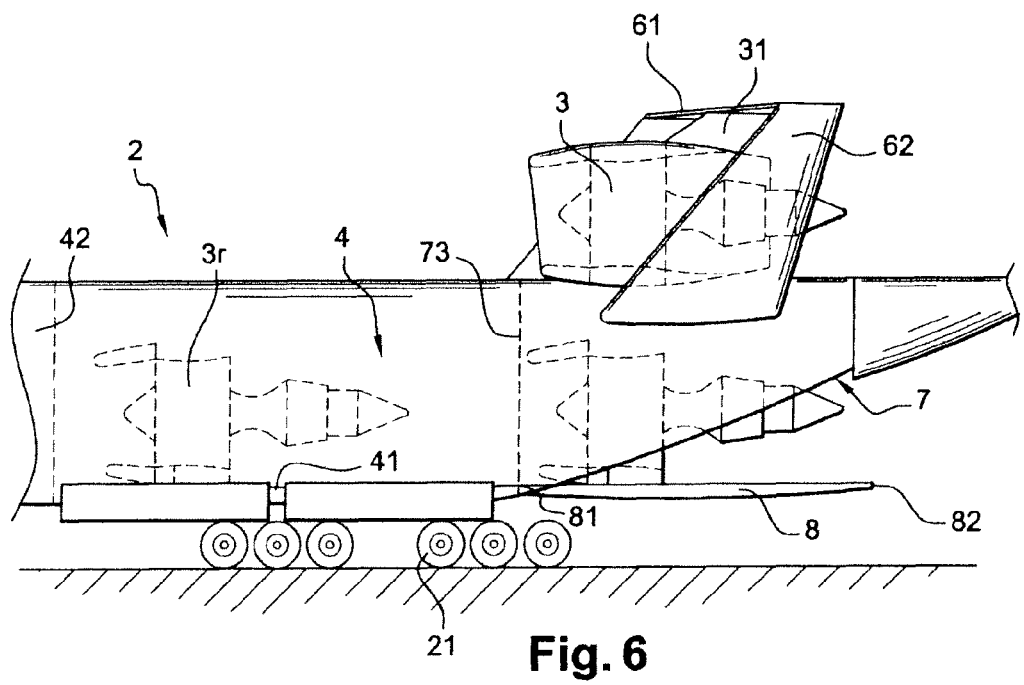
FIG. 6: an illustration in a side view of positions of engines in the cargo compartment, on the ramp or fixed to the empennage.

The lower hatch(es) 8 comprise at least three privileged positions:
 in a first position, the lower hatches 8 are lifted so that the lower openings 72 of the wells 7 are closed, where the hatch (es) 8 ensure(s), in this position and due to their external shapes, the aerodynamic continuity of the fuselage 2. This is the normal position when the plane 1 is in the flight configuration, as represented in FIGS. 1a, 1b and 1c;
 in a second position, illustrated in FIGS. 2a, 2b and 2c, the lower hatch(es) 8 is (are) lowered so that their free sides 82, that is their sides opposite the articulated sides 81, are in proximity of the ground when the plane 1 is on the ground. Such hatches, whose upper surface shape is essentially planar, then function as ramps allowing access to the cargo compartment; and
 finally, in a third position, called intermediate position, which is illustrated in FIG. 6, between the first position and the second position, in which the upper surface of the lower hatch(es) 8 constitutes a substantially horizontal work surface at the level of the floor 41 of the cargo compartment 4 outside said cargo compartment.

Because of these second and third functions, which are ensured by the lower hatches 8, these hatches are also called ramps, and said ramps are constructed to present the structural solidity required for the passage of the loads that will circulate on them.

Advantageously, as visible in FIG. 2c, a single ramp 8, constructed with sufficient width, is used to close the lower opening 72 of all the wells 7, but this choice is not obligatory, one ramp per well may be preferred for other operational reasons.

The configuration comprising:
 the position of the engines 3 above the fuselage 2;
 the wells 7 under the engines 3 traversing the fuselage 2;
 the cargo compartment 4 capable of receiving at least one engine and comprising a partition 73 which is shared with the well 7; and
 the ramp 8 forming, in a given position, a work surface in the extension of the floor 41 of the cargo compartment 4;
 as described above, makes it possible with the plane 1 to dismount a propulsion engine 3 in an autonomous way, and to place said engine in the cargo compartment 4, or to install on the plane 1 a propulsion engine 3 that was stored in the cargo compartment 4.

Figure 5:
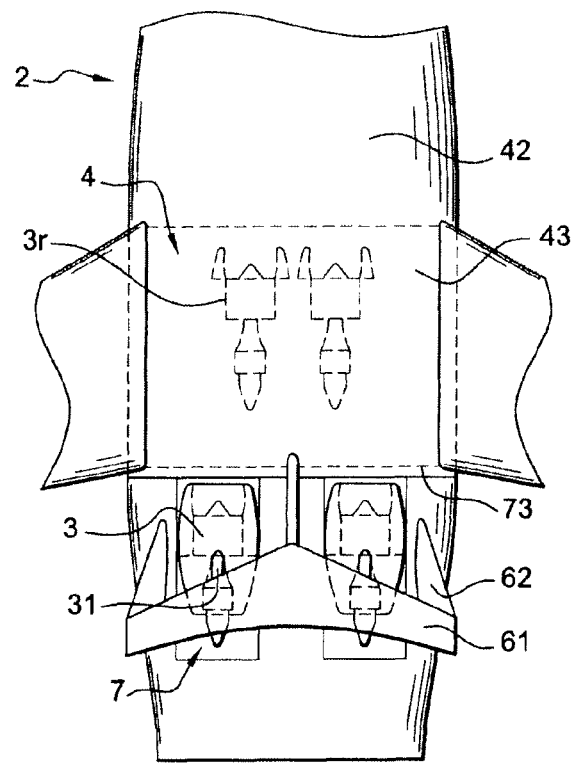
FIG. 5: an illustration in a top view of positions of engines in the cargo compartment, on the ramp, or fixed to the empannage.

Referring essentially to FIGS. 5 and 6, to carry out an operation of dismounting an engine 3 fixed under the horizontal empannage (61), a tool, not represented, for lifting and lowering the engine, which consists essentially of a block and tackle system, is fixed, on the one hand, to the mounting structures to which the engine 3 is attached, and, on the other hand, to the engine itself. This type of tool to lower and lift engines that are fixed to mounting structures under the wings of a plane already exists. Then the attachments securing the engine 3 to the mounting structure 31 are disassembled, followed by lowering the engine 3 through the well 7, whose upper hatch 74 is in the open position, by means of the tool for lifting and lowering, to the ramp 8, more precisely to a transport and handling cradle, not represented, for example, it is transported in the cargo compartment 4, after having been placed previously on the ramp 8 itself in an intermediate position which is substantially horizontal to place the engine.

The engine 3 can then be detached from the lifting and lowering tool, and the cradle with the engine 3 can be moved from the ramp 8 into the cargo compartment 4. The upper surface of the ramp 8 and of the floor 41 of the cargo compartment 4 being at the same level, and both being substantially horizontal, the movement of the engine 3 on the cradle from the ramp 8 into the cargo compartment 4 requires relatively little force, the cradle itself being equipped with wheels, or the floors of the ramp and of the cargo compartment being equipped with rollways, which are advantageously motorized, of the rollway type used today in the cargo compartments of planes.

It is easy to understand that the reverse sequence of the above operations allows the fixation under the horizontal empennage 61 of an engine 3r that is transported in the cargo compartment 4.

The cargo compartment 4 used to transport at least one engine 3r, particularly for engines of large diameter, such as jet engines with high dilution ratio, which pose transport difficulties, has necessarily an internal height which is greater than the height of the engine to be transported, as well as an exit 42, arranged in the partition 73 between the cargo compartment 4 and the wells 7, of sufficient dimension to enter the engine 3, 3r on its cradle into and exit from the cargo compartment 4.

Advantageously, to avoid a negative effect on the plane 1 of a cargo compartment door on the exit 41, which necessarily presents large dimensions because of the dimensions of the engines in question, and adds unwanted weight, the cargo compartment 4 in which the engine(s) is (are) transported is not pressurized. To the extent that it is not necessary for persons to have access to the interior of this cargo compartment during flight, the pressurization of the cargo compartment 4 seems not necessary, and if needed, such monitoring can be carried out through a porthole between the cargo compartment 4 and the pressurized zone 42 and/or by video means.

Advantageously, the cargo compartment 4 uses the entire available height inside the fuselage 2, which height in the other parts of the plane is, if applicable, distributed over two or more levels of floors or decks, for example, two passenger decks, or two cargo decks, or one or two passenger decks and a cargo deck. Thus, when the cumulative total height of the different decks is sufficient, it is not necessary to establish the interior height of the fuselage 2 for the purpose of transporting an engine 3, 3r, or at least this condition has a less restrictive effect.

The essential outline of a sequence of replacement of an engine 3 is as follows:

opening of the upper hatch 74 of the well 7 corresponding to the failing engine 3;

placing the ramp 8 in a substantially horizontal intermediate position;

fixing a tool, not represented, for lifting and lowering to the mounting structure 31, on the one hand, and to the engine 3, on the other hand;

detaching the failing engine 3 and lowering it until the failing engine rests on a transport and handling cradle, not represented, which was placed previously on the ramp 8;

moving the engine 3 on the cradle laterally on the ramp 8;

taking the replacement engine 3r out of the cargo compartment 4 to place it on the ramp 8 under the well 7 of the dismounted engine;

lift the replacement engine 3r using the lifting means used to lower the failing engine 3, fixing the replacement engine 3r to the mounting structure 31, and dismantling the lowering and lifting tool; and placing the failing engine 3 and the empty cradle of the replacement engine 3r in the cargo compartment 4.

After the completion of the sequence, the failing engine 3 and the replacement engine 3r are inverted between the position with hooking under the horizontal empennage 61 and the position in the cargo bay 4.

To be able to switch the failing engine 3 and the replacement engine 3r, it is advantageous to design the cargo compartment 4 so that it is possible to put at least two engines in it.

In this case, before the start of the sequence of replacement of a failing engine 3, the cargo compartment 4 contains an engine 3r in operating condition on a first cradle and a second cradle without engine.

When the failing engine 3 is dismounted, the second cradle is placed on the ramp 8 to allow said failing engine to be placed there, and then said failing engine on said second cradle is placed in the cargo compartment 4. The ramp 8 is then cleared for the replacement engine 3r in operating condition to be placed on the ramp 8 and then reinstalled on the plane 1, and the first cradle, which is then empty, is replaced in the cradle 4.

Such a configuration for the cargo compartment 4, which can receive two engines, is also advantageous for transporting two engines from one logistics site to another logistics site, when the missions are carried out under conditions where the plane 1 is not assumed to be capable of carrying out the replacement of an engine in an autonomous manner.

Such a configuration of the cradle compartment 4 is obtained advantageously with a plane fuselage 2 that is substantially broader than high, as illustrated in the configurations presented in FIGS. 1a, 1b and 1c, where the width of said fuselage is chosen advantageously so that the volumes of the landing gear casings 43, which would interfere in the cargo compartment 4, and which are used for housing the landing gear 21 in the configuration with the landing gear entered, are separated sufficiently to maintain a sufficient width at the level of the floor 41 of the cargo compartment 4 to receive two engines side by side.

In the case where the cargo compartment 4 could not have sufficiently large dimensions to receive two engines side by side, notably because of the choice of a narrower fuselage geometry 2 than that of FIG. 1, but only one engine, it is still possible to carry out the replacement according to a procedure that is similar to the procedure described, either by moving the failing engine 3 on its cradle from the ramp 8, storing it temporarily on the floor, using for this purpose the movements of the ramp 8, to bring the engine 3r in operating condition, which is to be reinstalled, onto the ramp 8 which has thus been cleared and returned into a substantially horizontal intermediate position, or by providing a sufficiently broad ramp 8 to allow the lateral movement of the failing engine 3 on one side of the ramp, in the direction of the positive Y values, or of the negative Y values, from the start into a position opposite the engine to be replaced, and to move the engine 3r in operating condition out of the cargo compartment.

Once the replacement engine 3r is installed on the plane 1, the failing engine 3 is placed in the cargo bay 4.

In these cases, the empty cradle is transported, for example, in the cargo compartment 4 so it can be placed on the ramp before taking the replacement engine 3r out of the cargo compartment, for example, in the back of the transported engine 3r, if the cargo compartment is sufficiently long, or on the ramp 8 itself, where the cradle is then accommodated in a well 7 when the ramp 8 is closed in the first position. In addition, if necessary, the cradle for the engines 3, 3r is made of several parts so that it can be disassembled during transport and assembled to be used.

Thus, the plane 1 is autonomous in the case of a problem with the propulsion engine 3, i.e., a maintenance team is capable of carrying out the replacement of an engine that has broken down without waiting for external help.

As a function of the dimensions of the cargo compartment 4, of the relative position of the cargo compartment compared to the wells 7, of the number of transported engines 3r, of the width of the ramp 8 along the direction Y . . . , the sequence of the operations of replacement of an engine is adapted to take into account special configurations or constraints.

For example, if the engines are arranged above the fuselage more forward than in the described example, and a cargo compartment capable of containing engines is provided in the rear, along the direction of the negative X values in the axes of the plane, of the wells 7, the engines are transported advantageously in the rear of said wells, and the exits 42 in this case will naturally be provided in the rear vertical walls of the wells.

An important advantage of the characteristics that are common to the plane configurations proposed because of the arrangement of the engines 3, the maintenance wells 7, and the arrangement of the cargo compartments 4, results from the capacities that such planes have to operate in territories that are far from the logistics bases where the operations to return a plane to a condition so it can fly, including the replacement of an engine, are usually carried out, or at least organized. In particular, in the case of a logistics transport military plane that operates in a difficult environment, it is possible to make the plane operational after a breakdown of an engine and take off with nominal performances, without having to abandon valuable equipment to reduce the weight of the plane, which, without the disclosed embodiments, would have had to take off with a broken down engine.

A direct consequence, for a plane that is intended for interventions in hostile theaters of operation, is that it is possible, at a much reduced risk of losing the plane (by abandoning it in a distant region), to perform interventions with a twin engine plane, whereas the need to take off again with a broken down engine would normally have required a plane equipped with three or four engines.

This possibility of using a twin engine plane has very advantageous economic consequences, both in terms of the initial investment for the acquisition of a fleet of planes and in terms of operational costs.

The so-called high-wing configuration, which corresponds to the illustrations of FIG. 1b and of FIG. 2, which is used for the description of the detailed example of an embodiment, corresponds also to a general plane architecture which is adapted to a cargo plane intended to evolve on platforms that are arranged more or less summarily.

The high wing allows, particularly in the case of a plane intended for military transport, a better clearance around the plane when it is on the ground, both with respect to obstacles on the ground during the movement of the plane and with respect to movements of persons and engines during the operations of loading and unloading through the numerous exits that can be arranged in the fuselage.

The high wing also avoids a negative effect on the organization of a rear cargo compartment with large dimensions, where the structure of the wing which traverses the fuselage is then at the ceiling, and not at floor level, as is the case with a low wing which limits the possibility of extending the cargo compartment forward, along the X axis.

The high wing also makes it possible to improve the coverage of the air intakes of the engines located above the fuselage, which has the effect of reducing the different signatures of the plane in the acoustic, infrared and radar domains, which are sensitive to numerous threats for the plane.

It is apparent from the description that the proposed architecture solves a critical problem of modern planes, particularly when these planes must land far from logistic bases to replace an engine, by giving the plane the capacities to transport at least one replacement engine for its own purposes and to replace a failing propulsion engine in an autonomous manner with reduced means.

In contrast to the current transport planes, the cargo compartment which is specialized for the transport of one or more engines prevents any substantial negative effect on the transport of other materials in cargo compartments of the plane that are intended for cargo.

The invention claimed is:

1. A plane comprising;
a fuselage;
at least one propulsion engine maintained above the fuselage;
a horizontal stabilizer maintained above the fuselage; and
a maintenance well traversing the fuselage substantially vertically with respect to the at least one propulsion engine, in which said engine can be lifted or lowered, wherein:
a cargo compartment comprising a floor is arranged in the fuselage, where the dimensions along the height, the length and the width of said compartment are compatible with the loading and storing of a propulsion engine;
the cargo compartment and the well have a common separation wall, where said well comprises an exit whose dimensions allow the passage of an engine;
a lower hatch for closing a lower opening of the well comprises a position in which the upper surface of said hatch is substantially horizontal and is substantially an extension of the floor of the cargo compartment; and
the cargo compartment is located in the front, along the direction of the movement of the plane in flight, of the well.

2. A plane according to claim 1, in which the width of the cargo compartment allows the transport of at least two propulsion engines of the plane next to each other along the wing span of the plane.

3. A plane according to claim 1 in which the lower hatch is connected by articulation on an edge of said hatch, in proximity of the exit, along an axis which is substantially in the plane of the floor of the cargo compartment.

4. A plane according to claim 3, in which the lower hatch closes, in the closed position, two or more wells.

5. A plane according to claim 1, in which the height of the cargo compartment corresponds at least to a cumulative height of at least two decks of a zone of the fuselage adjacent to said cargo compartment.

6. A plane according to claim 1, in which the cargo compartment is not pressurized during flight.

7. A plane according to claim 1, in which the engine(s) is (are) maintained above the fuselage fixed to a support structure comprising a horizontal empennage maintained above the fuselage by a substantially vertical structure, where each engine is associated with a well traversing the fuselage.

8. A plane according to claim 1, in which the substantially vertical structure ensures a vertical empennage function.

9. A plane according to claim 7, in which each engine is fixed under the horizontal empennage through the intermediary of a mounting structure.

* * * * *

UNITED STATES PATENT AND TRADEMARK OFFICE
CERTIFICATE OF CORRECTION

PATENT NO.       : 8,113,464 B2  
APPLICATION NO.  : 12/108662  
DATED            : February 14, 2012  
INVENTOR(S)      : Olivier Cazals Page 1 of 1

It is certified that error appears in the above-identified patent and that said Letters Patent is hereby corrected as shown below:

ON THE TITLE PAGE:

Insert Item -- (30) Foreign Application Priority Data  
Apr. 25, 2007 (FR) 0754696 --

Signed and Sealed this  
Fifth Day of June, 2012

David J. Kappos  
*Director of the United States Patent and Trademark Office*